(12) United States Patent
Yen et al.

(10) Patent No.: US 7,370,073 B2
(45) Date of Patent: May 6, 2008

(54) USING VIEWERSHIP PROFILES FOR TARGETED PROMOTION DEPLOYMENT

(75) Inventors: Felix Yen, Sudbury, MA (US); Kirk Cameron, Whitinsville, MA (US); Mark Fagnani, Watertown, MA (US)

(73) Assignee: Navic Systems, Inc., Needham, MA (US)

( * ) Notice: Subject to any disclaimer, the term of this patent is extended or adjusted under 35 U.S.C. 154(b) by 650 days.

(21) Appl. No.: 09/873,786

(22) Filed: Jun. 4, 2001

(65) Prior Publication Data
US 2002/0073419 A1    Jun. 13, 2002

Related U.S. Application Data

(60) Provisional application No. 60/253,488, filed on Nov. 28, 2000.

(51) Int. Cl.
*G06F 15/16* (2006.01)
(52) U.S. Cl. ............... 709/203; 709/219; 709/223; 725/45; 725/46; 705/14
(58) Field of Classification Search ............... 709/217, 709/219, 223, 203; 725/32, 45–46; 705/14
See application file for complete search history.

(56) References Cited

U.S. PATENT DOCUMENTS

| | | | | |
|---|---|---|---|---|
| 4,329,675 | A | 5/1982 | Van Hulle | 358/86 |
| 4,331,974 | A | 5/1982 | Cogswell et al. | 358/86 |
| RE33,808 | E | 1/1992 | Wright, Jr. | 358/86 |
| 5,155,591 | A | 10/1992 | Wachob | 358/86 |
| 5,389,964 | A | 2/1995 | Oberle et al. | 348/9 |
| 5,515,098 | A | 5/1996 | Carles | 348/8 |
| 5,532,732 | A | 7/1996 | Yuen et al. | 348/1 |
| 5,559,548 | A | 9/1996 | Davis et al. | 348/6 |
| 5,579,055 | A | 11/1996 | Hamilton et al. | 348/476 |
| 5,585,866 | A | 12/1996 | Miller et al. | 348/731 |
| 5,589,892 | A | 12/1996 | Knee et al. | 348/731 |

(Continued)

FOREIGN PATENT DOCUMENTS

EP    1 071 287 A2    1/2001

(Continued)

*Primary Examiner*—Oanh Duong
(74) *Attorney, Agent, or Firm*—Hamilton, Brook, Smith & Reynolds, P.C.

(57) ABSTRACT

A system for generating viewership profiles to facilitate distributing promotions based on the profiles to one or more network devices, such as set top boxes. The system includes a promotion agent associated with each network device which collects viewing activity data of the network device. For example, the viewing activity data may include a channel the network device was tuned to, a time when the network device was tuned to the channel, and a time the network device was tuned away from the channel. The collected viewing activity data is then transmitted, for example, every twenty-four hours, to a life-cycle manager server, which also periodically receives a program schedule. The program schedule typically specifies the channel on which a particular program was displayed, as well as the time the program was shown. The life-cycle manager server correlates the viewing activity data with the program schedule to generate the viewership profile of the network device. The life cycle manager server determines the viewing behavior for four, eight, and twelve week periods, for example, or for a time period specified by a user.

44 Claims, 6 Drawing Sheets

U.S. PATENT DOCUMENTS

| | | | |
|---|---|---|---|
| 5,629,733 A | 5/1997 | Youman et al. | 348/7 |
| 5,635,978 A | 6/1997 | Alten et al. | 348/7 |
| 5,673,089 A | 9/1997 | Yuen et al. | 348/734 |
| 5,740,549 A | 4/1998 | Reilly et al. | 705/14 |
| 5,774,170 A | 6/1998 | Hite et al. | 348/9 |
| 5,781,246 A | 7/1998 | Alten et al. | 348/569 |
| 5,793,438 A | 8/1998 | Bedard | 348/569 |
| 5,805,204 A | 9/1998 | Thompson et al. | 348/13 |
| 5,812,123 A | 9/1998 | Rowe et al. | 345/327 |
| 5,822,123 A | 10/1998 | Davis et al. | 348/564 |
| 5,844,620 A | 12/1998 | Coleman et al. | 348/461 |
| 5,850,218 A | 12/1998 | LaJoie et al. | 345/327 |
| 5,870,150 A | 2/1999 | Yuen | 348/553 |
| 5,886,746 A | 3/1999 | Yuen et al. | 348/564 |
| 5,977,962 A | 11/1999 | Chapman et al. | 345/327 |
| 6,002,393 A | 12/1999 | Hite et al. | 345/327 |
| 6,005,562 A | 12/1999 | Shiga et al. | 345/327 |
| 6,005,597 A * | 12/1999 | Barrett et al. | 725/46 |
| 6,006,265 A | 12/1999 | Rangan et al. | 709/226 |
| 6,014,184 A | 1/2000 | Knee et al. | 348/731 |
| 6,020,929 A | 2/2000 | Marshall et al. | 348/564 |
| 6,034,678 A | 3/2000 | Hoarty et al. | 345/327 |
| 6,052,145 A | 4/2000 | Macrae et al. | 348/10 |
| 6,055,573 A | 4/2000 | Gardenswartz et al. | 709/224 |
| 6,064,377 A | 5/2000 | Hoarty et al. | 345/327 |
| 6,084,628 A | 7/2000 | Sawyer | 348/14 |
| 6,100,883 A | 8/2000 | Hoarty | 345/327 |
| 6,100,917 A | 8/2000 | Tsutsui et al. | 348/13 |
| 6,119,098 A | 9/2000 | Guyot et al. | 705/14 |
| 6,574,793 B1 * | 6/2003 | Ngo et al. | 725/32 |
| 6,614,987 B1 * | 9/2003 | Ismail et al. | 386/83 |
| 6,637,029 B1 * | 10/2003 | Maissel et al. | 725/46 |
| 6,718,551 B1 * | 4/2004 | Swix et al. | 725/32 |
| 6,738,978 B1 * | 5/2004 | Hendricks et al. | 725/35 |
| 6,918,131 B1 * | 7/2005 | Rautila et al. | 725/34 |
| 6,983,478 B1 * | 1/2006 | Grauch et al. | 725/13 |
| 2002/0059094 A1 * | 5/2002 | Hosea et al. | 705/10 |
| 2002/0152117 A1 * | 10/2002 | Cristofalo et al. | 705/14 |
| 2003/0020744 A1 * | 1/2003 | Ellis et al. | 345/723 |
| 2004/0044677 A1 * | 3/2004 | Huper-Graff et al. | 707/102 |
| 2005/0149964 A1 * | 7/2005 | Thomas et al. | 725/9 |

FOREIGN PATENT DOCUMENTS

| | | |
|---|---|---|
| WO | WO 99/52285 | 10/1999 |
| WO | WO 01/22731 A1 * | 3/2001 |

* cited by examiner

USING VIEWERSHIP PROFILES FOR TARGETED PROMOTION DEPLOYMENT

RELATED APPLICATIONS

This application claims the benefit of U.S. Provisional Application No. 60/253,488, filed on Nov. 28, 2000. The entire teachings of the above application is incorporated herein by reference.

BACKGROUND OF THE INVENTION

At the present time, most data network devices located in the residences include some type of personal computer. Typically, these personal computers are used to connect to Internet Service Providers over dial-up connections to execute application programs such as email clients and Web browsers that utilize the global Internet to access text and graphic content. Increasingly, the demand is for multimedia content, including audio and video, to be delivered over such networks. However, the backbone architecture of purely data networks, especially those designed for use with the telephone network, were not originally designed to handle such high data rates.

The trend is towards a more ubiquitous model where the network devices in the home will be embedded systems designed for a particular function or purpose. This has already occurred to some degree. Today, for example, cable television (CATV) network set-top boxes typically have limited data communication capabilities. The main function of the data devices is to handle channel access between residential users and a head end or server on the cable TV network.

However, it is estimated that the worldwide market for Internet appliances such as digital set-top boxes and Web-connected terminals will reach $17.8 billion in 2004, and millions of such digital set-top boxes have already been deployed. Increasingly, advertisers and content providers view the cable set-top as the first platform of choice for widespread delivery of a suite of intelligent content management and distribution services.

In the future, the functionality offered by these set-top boxes or other embedded platforms, such as a game system, will be expanded. For example, they may offer Internet browsing capabilities and e-commerce serving capabilities. Moreover, it is anticipated that common-household appliances will also have network functionality, in which they will be attached to the network to automate various tasks.

SUMMARY OF THE INVENTION

The digital set top box provides certain interesting functionalities, such as the ability to collect data, such as a log of the channels watched over time, and other events. The set top box can be designed and programed to report this information to a central location. At the central location, this data can be aggregated for many hundreds of thousands of users. This information, when coupled with other information such as demographics, can then be used by advertisers and service providers to target individuals or blanket defined market segments with promotions, advertisements, and content. The digital delivery of promotions can then allow for impulse responses yielding immediate increases in revenues.

However, to effectively target specific set top boxes with promotions, the viewership profiles of the set top boxes must be generated. These profiles characterize the viewing behavior of the viewers associated with the individual set top boxes.

The present invention implements a system for generating viewership profiles to facilitate distributing promotions based on the profiles to one or more network devices, such as set top boxes.

Specifically, the system includes a promotion agent associated with each network device which collects viewing activity data of the network device. For example, the viewing activity data may include a channel the network device was tuned to, a time when the network device was tuned to the channel, and a time the network device was tuned away from the channel.

The collected viewing activity data is then transmitted, for example, every twenty-four hours, to a life-cycle manager server, which also periodically receives a program schedule. The program schedule typically specifies the channel on which a particular program was displayed, as well as the time the program was shown.

The life-cycle manager server correlates the viewing activity data with the program schedule to generate the viewership profile of the network device. The life cycle manager server determines the viewing behavior for four, eight, and twelve week periods, for example, or for a time period specified by a user.

In another aspect, the invention implements a method for generating viewership profiles to facilitate distributing promotions based on the profiles to one or more network devices. The method includes collecting viewership activity data for each network device, and correlating the viewership activity with program schedules. The viewership profiles are generated for each network device based on the correlation.

The implementation of a system for generating viewership profiles in this manner assists network operators to cost effectively support the advanced features of the set top box, such as to provide targeted promotion and digital content distribution services. This enables network operators to generate new revenues and provide a richer interactive environment for consumers.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. Embodiments of the targeted promotion delivery system allow advertisers and service providers the ability to effectively utilize a multimedia network for targeting promotions at viewers through network devices. Network devices are targeted for promotion delivery based on device usage statistics collected from these devices and on demographic data. The promotion delivery system can target network devices in varying degrees of granularity from a single network device to entire market segments. Furthermore, the promotion delivery system is designed to ensure efficient use of network bandwidth when delivering promotions to prevent network congestion. The system can be implemented over a variety of multimedia networks containing large populations of network devices, such as television set top boxes, Internet phones, and other similar network appliances.

Figure 1A:
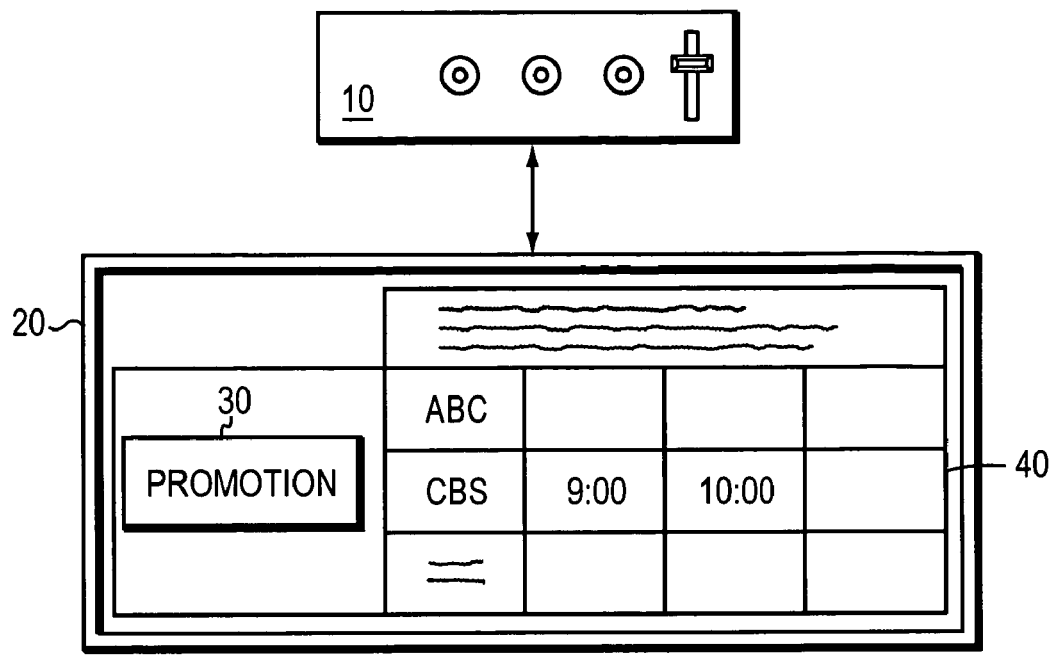
FIG. 1A is a block diagram illustrating a set top box attached to a television displaying a promotion in a full-screen electronic program guide according to one embodiment of the present invention.

FIG. 1A is a diagram illustrating a video display system with an active promotion according to one embodiment. Promotions include promotional content that may be presented in various multimedia formats including audio, video, graphics or icons, and Internet hyperlinks. Promotions are used to advertise goods and services, promote events, or present other commercial or non-commercial information.

Figure 1B:
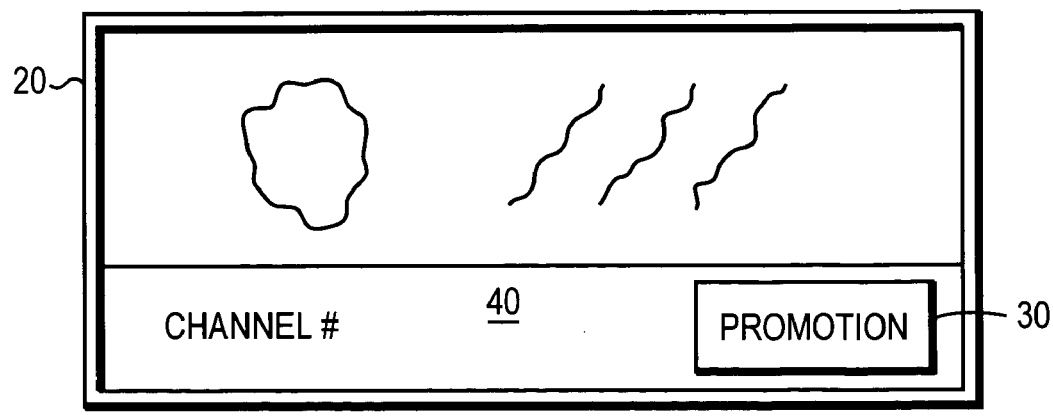
FIG. 1B is a block diagram illustrating the television of FIG. 1A displaying a promotion in a partial-screen electronic program guide.

Referring to FIG. 1A, the video display system 1 includes network device or set top box 10 connected to a respective video display 20, such as a television. Promotions 30 typically include promotional content that may be presented in various multimedia formats including standard audio visual clips, but also computer graphics, icons, or Internet hyperlinks. Promotions are used to advertise goods and services, promote events, or present other commercial or non-commercial information. One or more promotions 30 may be simultaneously active within the video display 20 and may be displayed in different ways. For example, promotions 30 can be presented on electronic program guides, channel information bars 40 (FIG. 1B), or by overlaying video broadcast programming. Some active promotions allow user interaction such as linking to e-commerce web-sites via hyperlink connections or direct communication with the server subsystem to obtain additional software, such as device drivers, video games, or other application software.

The promotions 30 can be stored locally or in a stream in the network that is viewed as a virtual channel or a dedicated channel and located using a local moniker. The promotions 30 can be displayed as banners, hot spots, or full motion streams, such as personal video recorders. The promotions 30 could be for a video on demand (VOD) movie, commerce IPPV, an offer for a product, a pay for view event, and walled gardens. Although the promotions 30 in FIGS. 1A and 1B cover only a portion of the viewable screen area, the promotions may cover the entire screen area. Further, there may be multiple promotions 30 displayed on the video device 20, each promotion 30 being independently selectable. The multiple promotions 30 may cover a portion or the entire viewing screen area of the video device 20. Clicking on or accepting the promotion 30 by the viewer may cause the network device 10 to tune away from channel on which the promotion is displayed.

Figure 2:
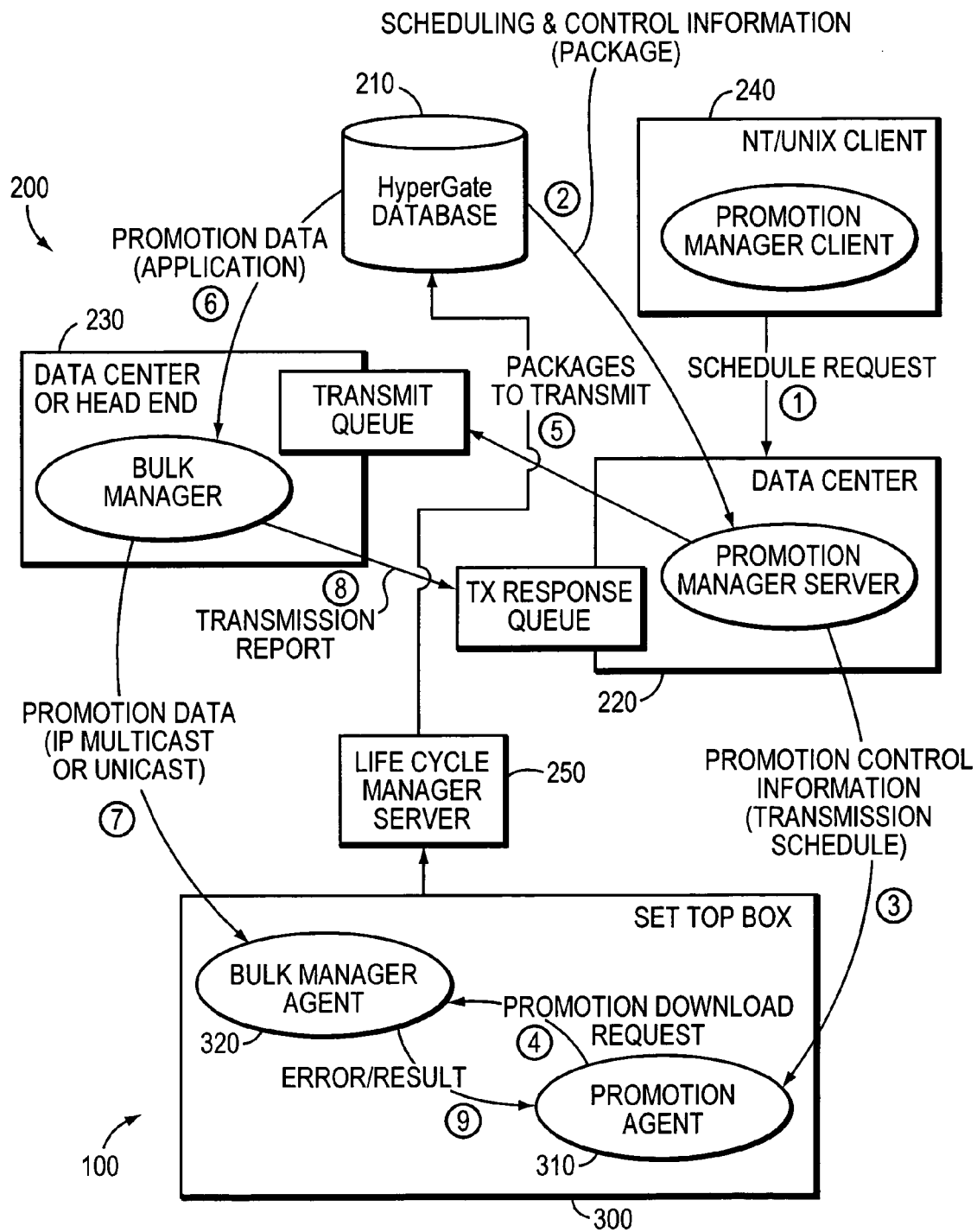
FIG. 2 is a schematic diagram illustrating the interaction between a server system and an embedded client system according to the invention.

FIG. 2 is a high-level system diagram illustrating a targeted promotion delivery system for a multimedia network according to one embodiment. The system 100 includes a promotion server subsystem 200 and a promotion agent subsystem 300 embedded within each of the network devices. The promotion server subsystem 200 and the promotion agent subsystems 300 communicate with each other through a combination of application-level messaging and serialized bulk data transmissions.

A life-cycle manager server 250 periodically collects viewer usage data from the promotion agent subsystem 300 of each of the network devices to generate viewership profiles. In television networks, the data collected by the life-cycle manager server 250 may include tuner data (i.e., a history of channels watched) and responses to past promotions. This history is kept on a relatively fine time scale, such as five seconds, or any other time period set by the user. In this way, it can be determined how long a particular promotion was deployed, or even which portions of a promotion or video program were viewed.

In more detail regarding promotion delivery, the promotion server subsystem 200 includes a database 210, a scheduler or promotion manager server 220, a bulk data server 230, and a promotion manager client 240 interfacing with the life-cycle manager server 250. The bulk data server is typically located at a central location in the multimedia network at a data center, head end, or divided between the two depending on the density and population of devices. The other components, the database 210, the promotion manager server 220, and the promotion manager client 240, are located at the data center.

The life-cycle manager server 250 of the promotion server subsystem 200 generate viewership profiles for each of the network devices from the collected data using a variety of statistical models. The viewership profiles are then used to associate each multimedia content viewing device with promotion groups.

Promotion groups are collections of network devices whose individual viewership profiles match membership criterion describing a particular demographic or viewership history. For example, a promotion group may be demographically based, i.e., "married women in their 30's with more than one school age child and a household income of at least $100,0000," or based on viewership history, i.e., "tends to watch the Golf Channel on Sunday afternoon." The membership criterion for a promotion group may be specified broadly to target an entire market segment (e.g., sports enthusiasts) or narrowly to target a niche portion of a market segment (e.g., badminton sport enthusiasts). Furthermore, membership within a promotion group can change over time in response to updates to the viewership profiles. Therefore, the promotion delivery system is adaptable to changes in viewer usage or viewership patterns by making adjustments to promotion groups.

Promotions are then scheduled for delivery to specific promotion groups. A promotion is scheduled for delivery to a promotion group by an advertiser or service provider entering a scheduling request for a promotion via the promotion manager client 240, or a promotion web console interfaced with an intranet and/or the Internet. The promotion manager server 220 packages the promotion for delivery and stores it in the database 210. Later, the package information is read from the database 210 and used to create customized transmission schedules that specify when and how each of the network devices that is associated with a promotion group is to receive it.

The promotion agent subsystem 300 embedded in each of the network devices includes a promotion agent 310 and a bulk data agent 320. Upon receipt of the transmission schedule messages, the promotion agent 310 processes each schedule entry and waits for the bulk data agent 320 to deliver each promotion identified in the transmission schedule. The bulk data agent 320 then handles the reception of the promotions from the scheduled data transmission as specified in the promotion download requests. In one embodiment, the bulk data agent 320 tunes into a multicast data transmission stream at a specified time and channel or network address specified in the transmission schedule.

The promotion manager server 220 extracts the promotion package from the database 210 and converts it into a transmission request that is sent to the bulk data server 230. The bulk data server 230 fetches the promotions from the database 210 that are identified in the transmission request message, and transmits them via multicast or broadcast transmission depending on transmission control data specified in the transmission request. The promotions can also be stored in the bulk data server 230 or in a cache.

Once the promotions have been successfully delivered, the promotions are activated at the network devices as specified in promotion control data of the transmission schedules. Promotion activation may be event, time, or channel driven. In is addition, Navic triggers or triggers embedded in broadcast streams such as Advanced Television Enhancement Forum (ATVEF), Vertical Blanking Interval (VBI), or in Moving Pictures Experts Group (MPEG) data streams may activate the promotions. Promotion activation may also occur because of some series of viewer events, for example, some pattern of channel surfing by the viewer may activate a promotion.

Figure 3A:
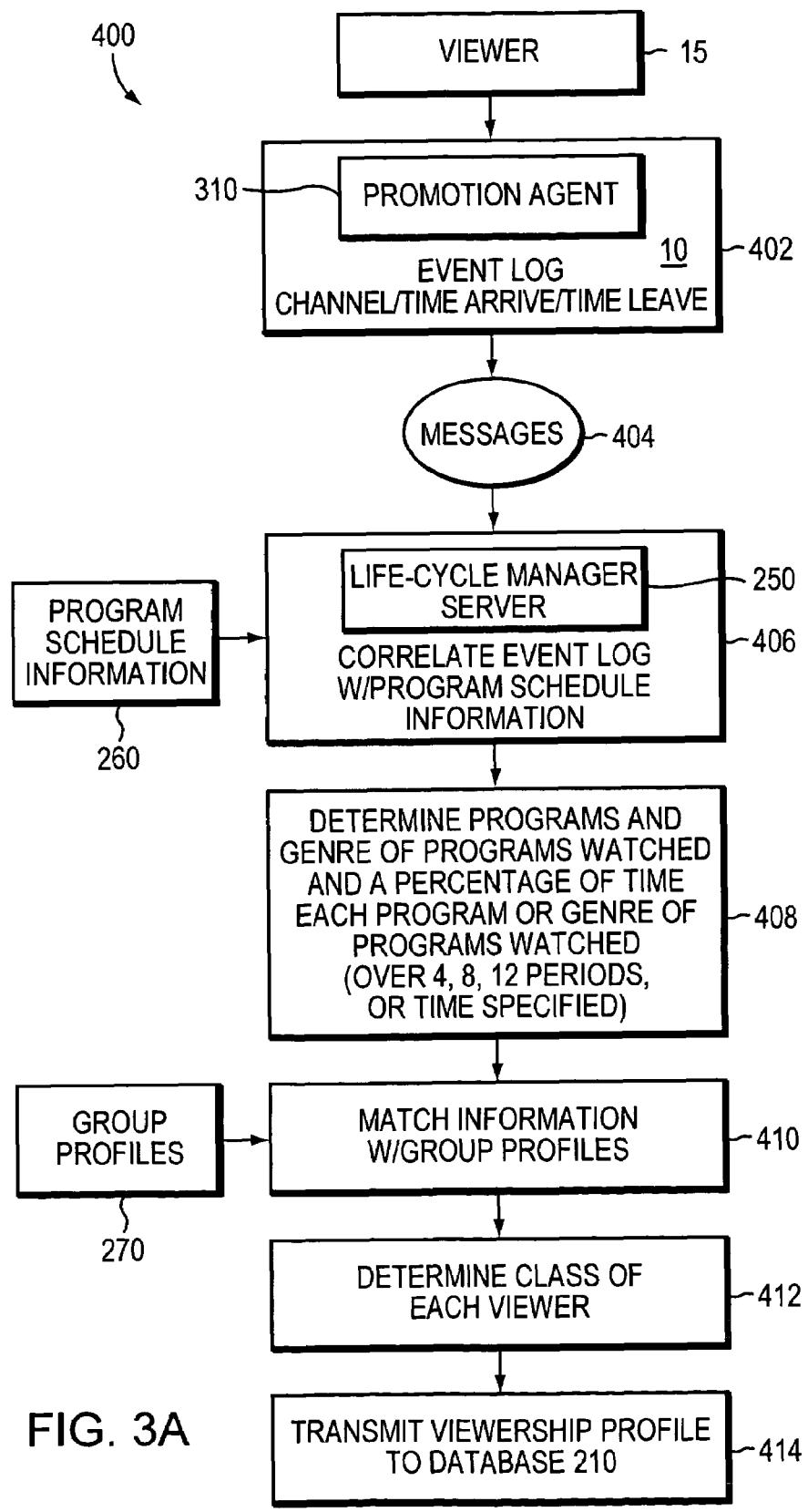
FIG. 3A is a process flow diagram illustrating a process for generating viewership profiles.

FIG. 3A illustrates a generalized process diagram 400 for creating a viewership profile of a viewer 15 who has tuned to a program channel on the set-top box 10. In a first step 402, the promotion agent 310 of the promotion agent subsystem 300 embedded in the set top box 10 creates a log of the viewer's activities. The log records the channel to which the this set top box is tuned to, the time the channel was tuned in, and the time the it left the channel. In the described embodiment, the event is recorded only if the period between the time the viewer tuned in the channel and the time the viewer tuned away from the channel is greater than about five seconds. By logging events that have only been watched for a period greater than five seconds, the promotion agent is able to distinguish shows that are actually watched from channel "surfing" by the viewer. Time periods other than five seconds can be set by the user. In fact, the collection of the viewership data is entirely configurable. That is, the user can set the policies for which the data is collected.

After the promotion agent 310 has logged viewer activities for a period time, such as twenty four hours, the logged activities are transmitted through messages, in a state 404, to the life cycle manager server 250. Note that the transmission of the activities can be governed entirely by policies configurable by the user. Thus, the viewer activities can be logged for any time period, or not at all. The messages are transmitted through a messaging protocol for unicast transmission, such as TCP/IP or UDP. The messaging protocol is described in more detail in the U.S. application 60/253,462, entitled "PROTOCOL FOR THROTTLING HIGH VOLUME MESSAGES," filed Nov. 28, 2000. In a state 406, the life cycle manager receives the log from the promotion agent 310. Also, in the state 406 a program schedule 260 is periodically transmitted to the life cycle manager server 250. Such program schedule data for broadcast network is typically available from commercial services.

After receiving the logged viewership activities and the program schedule 260, the life cycle manager server 250 correlates the data in the state 406. Then in a state 408, the life cycle manager determines the viewer behavior associated with set top box 10. In this step, the life cycle manager determines what programs were watched and the percentage of time each program was watched during its scheduled time slot. Further, the life cycle manager determines the genre of programs watched and the percentage of time each genre were viewed. The genres may be collections of programs associated with sports, news, comedies, or health shows. Note, that the total percentage of genres watched can exceed 100% because some shows may belong to multiple genres. The life cycle manager server determines the viewer behavior for four, eight and twelve week periods, for example, or for a time period specified by a user. Finally, the viewership profile of the viewer associated with the top box 10 is generated.

Next, in a state 410, the viewer behavior data generated by the life cycle manager server is matched with group profiles 270 provided by third parties, such as advertisers, to the life cycle manager server 250. These group profiles 270 may include age, gender, residence and other demographic data.

Subsequently, in a state 412, the matched viewership behavior data and group profiles 270 is used to determine the class of the viewer associated with the set top box 10. In a state 414, this viewership profile is transmitted to and stored in the database 210.

Figure 3B:
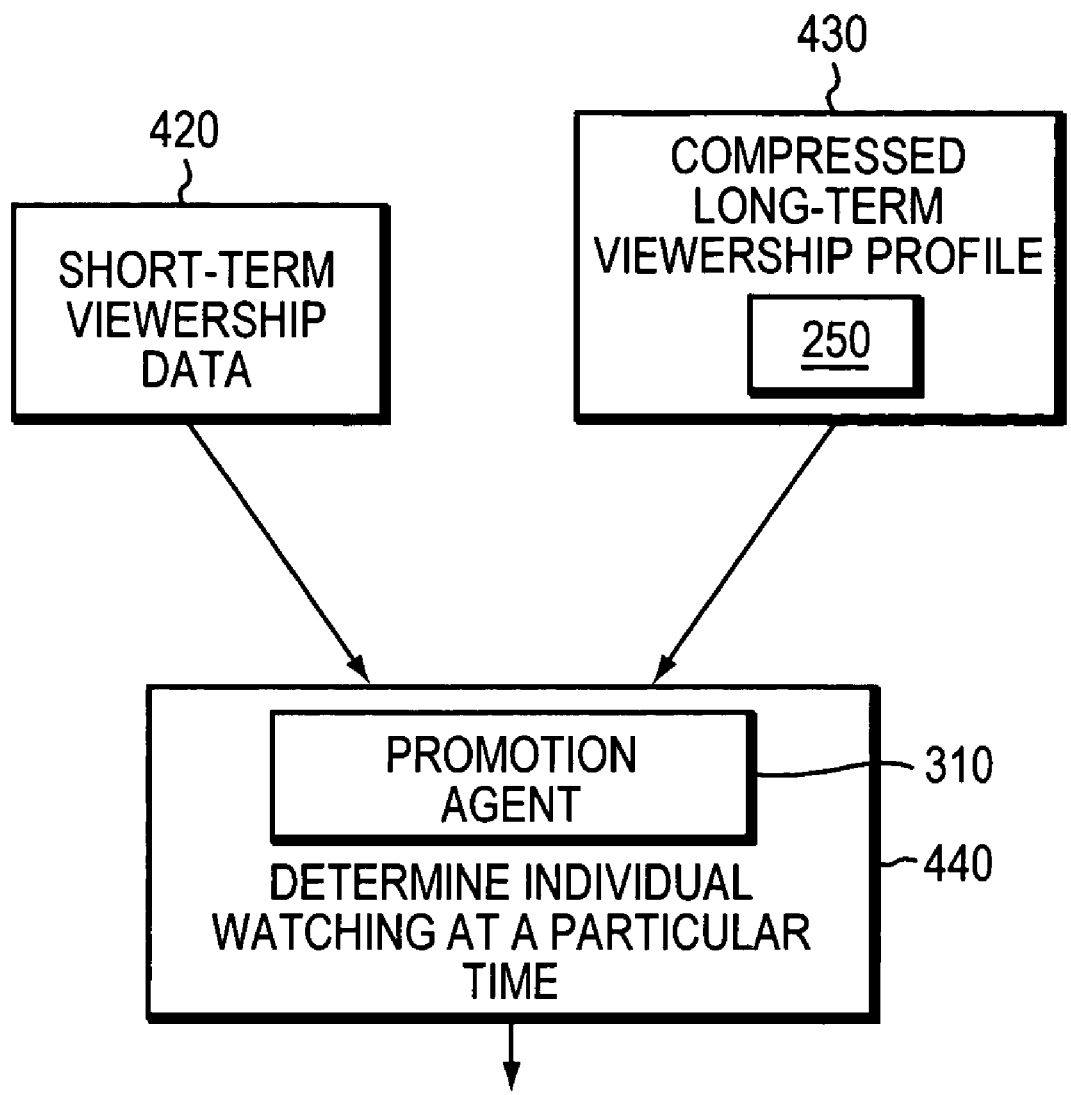
FIG. 3B is a process flow diagram illustrating a process for determining the type of individual tuned into a set top box at a given time.

Referring to FIG. 3B, the system 100 is also able in real time to compare short term viewership activity 420 associated with the set top box 10 with long term activity 430 as obtained in the process just described above. The short term activity 420 is collected by the promotion agent 310, and a compressed version of the long term activity is transmitted from the life cycle manager server 250 to the promotion agent 310. In a state 440, the promotion agent 310 then correlates the short term activity 420 with the long term activity 430 to establish the type of individual watching a program on a given set top box at a given moment.

After the viewership profiles of the set top box 10 in a network is generated, an advertiser, or anyone else interested in paying for the data, is able to make many uses of such data. For example, the advertiser may target certain promotion groups which are collections of network devices whose individual viewership profiles are matched to membership criteria. The membership criteria is usually based on demographics or geographic locations.

Figure 4:
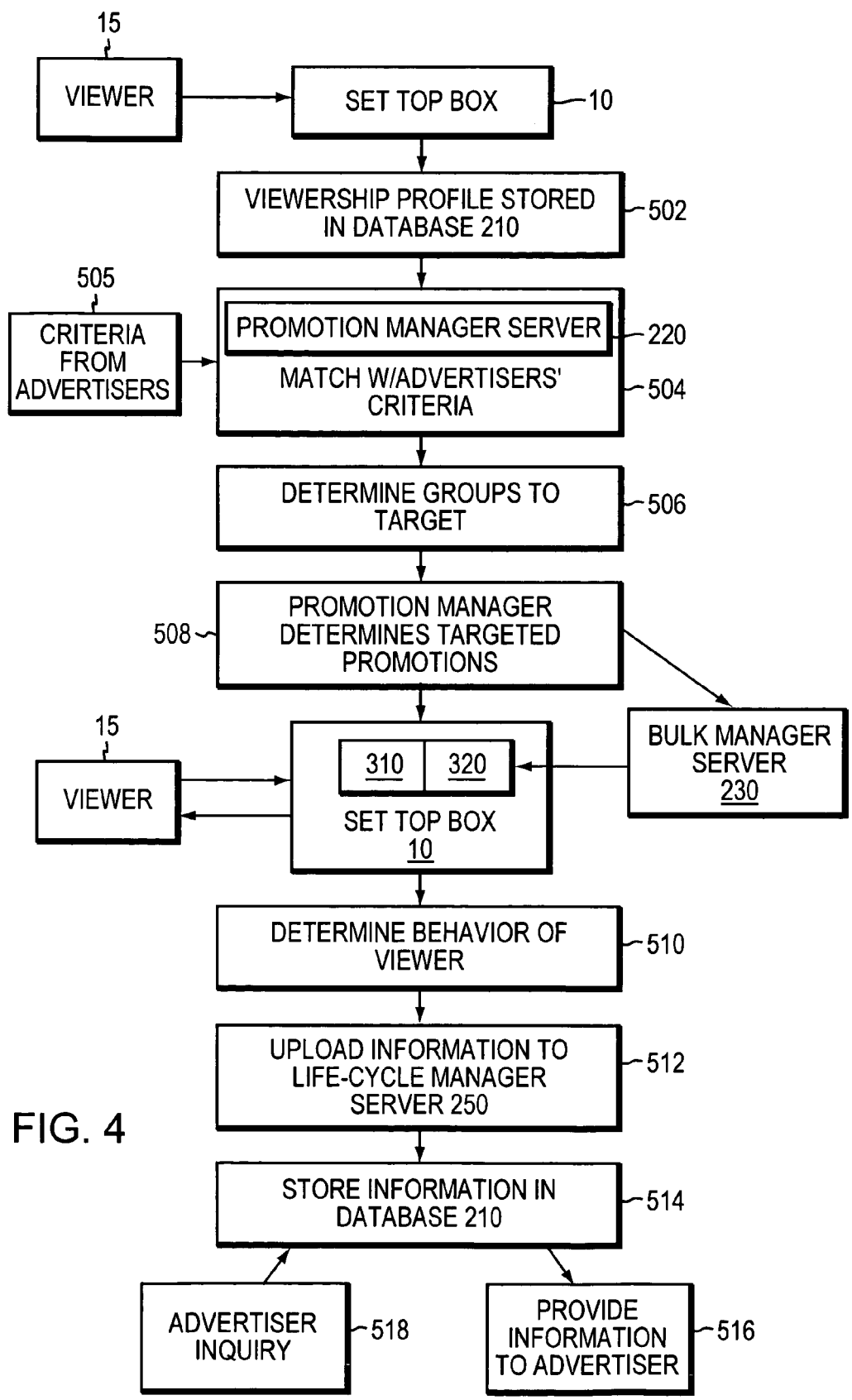
FIG. 4 is a process flow diagram illustrating a process for targeting network devices.

Referring to FIG. 4, a process for generating promotion groups is illustrated in detail. In a particular network, the set top box 10 is associated with the viewer 15. The viewership profile for the set top box 10 is obtained as described above. The data for the set top box 10 is then transmitted to the database 210, in a state 502, which in turn is transmitted to the promotion manager server 220 in a state 504. In the state 504, the promotion manager server 220 matches the viewership profile with the membership criteria 505 provided by third parties, for example, through the promotion manager client 240 (FIG. 2). The membership criteria may be based, for example, on demographics, geographic locations of the network devices, or channel and promotion history data of the network devices.

In a state 506, promotion groups are generated by the promotion manager server 220. Next, in a state 508, based on these promotion groups, the promotion manager server 220 determines which promotions to send to the set top box 10. As such, the promotion manager server 220 generates promotion schedules which specify when each promotion is to be shown on a particular set top box. The scheduling information is transmitted to the promotion agent 320 through the messaging protocol discussed above. The actual content or promotions is downloaded from the bulk manager server 230 to the bulk server agent 320 embedded in the set top box 10 when instructed by the promotion manager server 220. The bulk manager server 230 does not transmit the content through the messaging protocol discussed earlier. Rather, it employs a protocol, such as UDP, which is capable of efficiently transmitting multicast and broadcast media. The bulk data protocol is described in more detail in the U.S. application Ser. No. 09/519,221, entitled "MESSAGE ROUTER," filed Mar. 16, 2000. The scheduled promotions are then displayed on the video display 20 (FIG. 1A) on a particular channel at a specified time. Further, the promotions may be displayed at a designated time independent of what the viewers are watching, or the promotions may be displayed on particular shows the viewers are watching.

After the targeted promotions have been displayed, the system 100 is able to determine the success of the these promotions. For example, in a state 510, the promotion agent 310 collects data as to which scheduled promotions were actually watched by the set top box 10. That is, the promotion agent 310 can determine if the viewer watched a particular promotion as intended, or if the viewer to tuned away from the promotion by changing channels, for example. This data is uploaded in a state 512 to the life cycle manager 250 which transmits the data to the database 210 in a state 514. Thus, the system 100 is able to provide advertisers information related to the success of the promotions. This information can be provided in a state 516 directly to the advertiser after its scheduled promotion was shown, or the advertiser may make an inquiry of the information stored in the database 210 in a state 518.

Although the above discussion has been directed to a single viewer watching programs tuned to by a particular set top box, the present embodiment is able to distinguish viewing patterns of multiple viewers who watch programs delivered to a single set top box.

Figure 5:
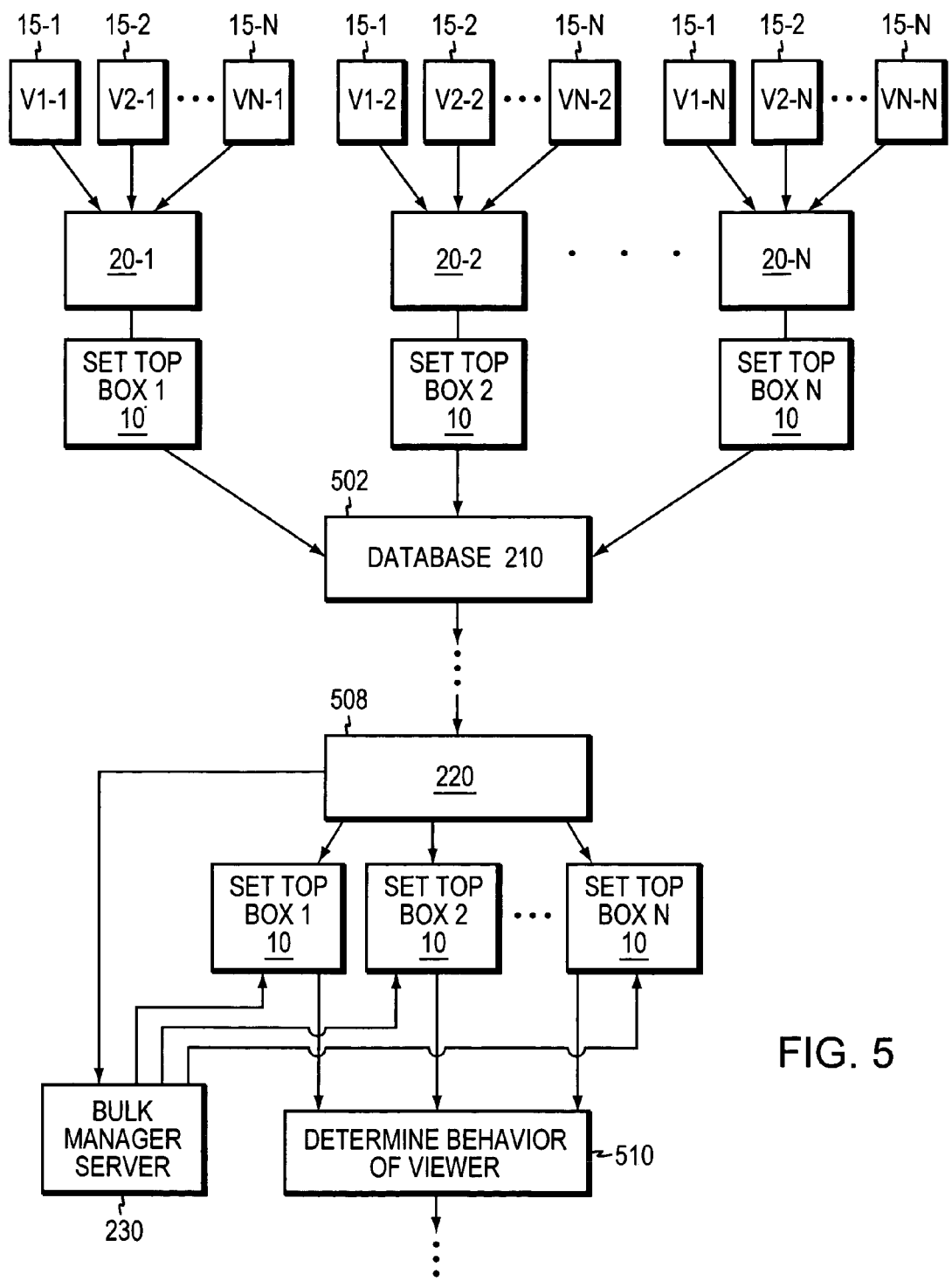
FIG. 5 is a process flow diagram illustrating the interaction of the system of FIG. 2 with multiple network devices.

As shown in FIG. 5, multiple viewers, 15-1 through 15-N, can view programs on their respective video display 20, via their set top boxes 10. Thus, by the process described above and as illustrated in FIGS. 3A and 3B, the system 100 is able to generate viewership profiles of each viewer associated with an individual set top box 10. Further, once the viewership profiles are generated, the process as described in reference to FIG. 4 enables the system 100 to determine which viewer(s) of viewers 15-1 through 15-N, may be watching their respective video display 20 at a particular time and what channel the set top box 10 is tuned to. As such, the system 100 is able to determine a particular viewer to target, as well as determining the success of the promotion which was targeted at a particular viewer.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for generating and using viewership profiles to facilitate distributing promotions based on the profiles of at least one network device, comprising:

a promotion agent embedded in a network device for collecting viewership activity data of the network device;

a life-cycle manager server which receives the viewership activity data from the promotion agent and correlates the viewership activity data with program schedules to determine a viewer behavior associated with the network device;

the life-cycle manager server matches the determined viewer behavior to a group profile to determine a class of viewer associated with the network device;

the life-cycle manager server generates a viewership profile for the network device based on the correlated viewer behavior and the matched class of viewer associated with the network device, the generated viewership profile including the viewer behavior associated with the network device and the class of viewer associated with the network device;

the life-cycle manager server informing the network device of a type of individual on which distribution of promotions to the network device is based, by forwarding the viewership profile to the promotion agent, the viewership profile including long-term viewership activity data of the network device; and the promotion agent collecting short-term viewership activity data of the network device and comparing the collected short-term activity data with the long-term activity data of the viewership profile in order to determine a type of individual presently interacting with the network device, the determined type of individual used to match the viewership profile with a membership criteria to generate a promotion group for distributing promotions.

2. The system of claim 1, wherein the viewership activity data of the network device includes a program channel on the network device.

3. The system of claim 1, wherein the viewership activity data includes a time at which the network device was tuned to the channel.

4. The system of claim 1, wherein the viewership activity includes a time at which the network device was tuned away from the channel.

5. The system of claim 1, wherein the viewership activity data is collected if the difference between a time the network device was tuned to the channel and a time the network device was tuned away from the channel is greater than a configurable time period.

6. The system of claim 1, wherein the viewership activity data is collected by the promotion agent over a twenty-four hour period before the viewership activity data is received by the life-cycle manager.

7. The system of claim 1, wherein the viewership activity data includes a program viewed by a viewer.

8. The system of claim 7, wherein the viewership activity data provides a percentage of time the program was viewed by the viewer.

9. The system of claim 8, wherein the percentage of time is precise to within about one percent.

10. The system of claim 7, wherein the program belongs to a genre.

11. The system of claim 10, wherein the viewership activity data provides a percentage of time which the genre is viewed.

12. The system of claim 11, wherein the percentage of time is precise to within about one percent.

13. The system of claim 7, wherein the program belongs to multiple genres.

14. The system of claim 1, wherein the viewership profile data is matched with a group profile.

15. The system of claim 14, wherein the group profile is based on viewer attributes.

16. The system of claim 15, wherein the attributes include a geographic location.

17. The system of claim 15, wherein the attributes include demographic characteristics.

18. The system of claim 15, wherein the attributes include a genre of programs.

19. The system of claim 1, wherein the short-term viewership activity data spans over a time period of about one minute.

20. The system of claim 1, wherein the short-term viewership activity data spans over a time period of about one hour.

21. The system of claim 1, wherein the viewership profile includes viewership activity data spanning a time period of about four weeks.

22. The system of claim 1, wherein the viewership profile includes viewership activity data spanning a time period of about eight weeks.

23. The system of claim 1, wherein the viewership profile includes viewership activity data spanning a time period of about twelve weeks.

24. The system of claim 1, wherein the viewership profile includes viewership activity data spanning a time period defined by a user of the system.

25. A method for generating and using viewership profiles to facilitate distributing promotions based on the profiles to at least one network device, comprising the steps of:
collecting viewership activity data for a network device;
correlating the viewership activity data with program schedules to determine a viewer behavior associated with the network device;
matching the determined viewer behavior to a group profile to determine a class of viewer associated with the network device;
generating a viewership profile for the network device based on the correlation and the matching, the generated viewership profile including the viewer behavior associated with the network device and the class of viewer associated with the network device;
informing the network device of a type of individual on which distribution of promotions to the network device is based, by forwarding the viewership profile to the network device, the viewership profile including long-term viewership activity data of the network device;
collecting short-term viewership activity data of the network device; and
comparing the collected short-term viewership activity data with the long-term viewership activity data of the viewership profile in order to determine a type of individual presently interacting with the network device, the determined type of individual used to match the viewership profile with a membership criteria to generate a promotion group for distributing promotions.

26. The method of claim 25, wherein the step of collecting viewership activity data further includes collecting channels selected on the network device.

27. The method of claim 25, wherein the step of collecting viewership activity data further includes collecting a time at which the network device was tuned to the channel.

28. The method of claim 25, wherein the step of collecting viewership activity data further includes collecting a time at which the network device was tuned away from the channel.

29. The method of claim 25, wherein the step of collecting viewership activity data collects viewership activity data if the difference between a time the network device was tuned to the channel and a time the network device was tuned away from the channel is greater than a configurable time period.

30. The method of claim 25, wherein the step of collecting viewership activity data is performed over a twenty-four hour period.

31. The method of claim 25, wherein the step of collecting viewership activity data includes collecting a program viewed by a viewer.

32. The method of claim 25, further comprising the step of matching the viewership profile of each network device with a group profile.

33. The method of claim 32, wherein the step of matching includes matching to the group profile based on viewer attributes.

34. The method of claim 33, wherein the step of matching includes matching to viewer attributes based on a geographic location.

35. The method of claim 33, wherein the step of matching includes matching to viewer attributes based on demographic characteristics.

36. The method of claim 33, wherein the step of matching includes matching to viewer attributes based on a genre of programs.

37. The method of claim 25, wherein the short-term viewership activity data spans over a time period of about one minute.

38. The method of claim 25, wherein the short-term viewership activity data spans over a time period of about one hour.

39. The method of claim 25, wherein the step of generating the viewership profile is based on viewership activity spanning a time period of about four weeks.

40. The method of claim 25, wherein the step of generating the viewership profile is based on viewership activity spanning a time period of about eight weeks.

41. The method of claim 25, wherein the step of generating the viewership profile is based on viewership activity spanning a time period of about twelve weeks.

42. The method of claim 25, wherein the step of generating the viewership profile is based on viewership activity spanning a configurable time period.

43. A system for generating and using viewership profiles to facilitate distributing promotions based on the profiles of at least one network device, comprising:
a promotion agent embedded in a network device for collecting viewership activity data of the network device;
a life-cycle manager server which receives the viewership activity data from the promotion agent and correlates the viewership activity data with program schedules to determine a viewer behavior associated with the network device;
the life-cycle manager server matches the determined viewer behavior to a group profile to determine a class of viewer associated with the network device;
the life-cycle manager server generates a viewership profile for the network device based on the correlated viewer behavior and the matched class of viewer associated with the network device, the generated viewership profile including the viewer behavior associated with the network device and the class of viewer associated with the network device;
the life-cycle manager server informing the network device of a type of individual on which distribution of promotions to the network device is based, by forwarding the viewership profile to the promotion agent, the viewership profile including long-term viewership activity data of the network device; and the promotion agent collecting short-term viewership activity data of the network device and comparing the collected short-term activity data with the long-term activity data of the viewership profile, transmitted from the life-cycle manager server to the promotion agent as a compressed version of the long-term activity data, in order to determine a type of individual presently interacting with the network device, the determined type of individual used to match the viewership profile with a membership criteria to generate a promotion group for distributing promotions.

44. A method for generating and using viewership profiles to facilitate distributing promotions based on the profiles to at least one network device, comprising the steps of:

collecting viewership activity data for a network device;

correlating the viewership activity data with program schedules to determine a viewer behavior associated with the network device;

matching the determined viewer behavior to a group profile to determine a class of viewer associated with the network device;

generating a viewership profile for the network device based on the correlation and the matching, the generated viewership profile including the viewer behavior associated with the network device and the class of viewer associated with the network device;

informing the network device of a type of individual on which distribution of promotions to the network device is based, by forwarding the viewership profile to the network device, the viewership profile including long-term viewership activity data of the network device;

collecting short-term viewership activity data of the network device; and comparing the collected short-term viewership activity data with the long-term viewership activity data of the viewership profile, transmitted to the network device as a compressed version of the long-term activity data, in order to determine a type of individual presently interacting with the network device, the determined type of individual used to match the viewership profile with a membership criteria to generate a promotion group for distributing promotions.

* * * * *